US008579508B2

(12) United States Patent
Mai et al.

(10) Patent No.: US 8,579,508 B2
(45) Date of Patent: Nov. 12, 2013

(54) RELATIVE SLIDING RAIL STRUCTURE USING PIVOTING MECHANISM

(75) Inventors: Chien Cheng Mai, New Taipei (TW); Way Han Dai, New Taipei (TW)

(73) Assignee: First Dome Corporation, New Taipei (TW)

(*) Notice: Subject to any disclaimer, the term of this patent is extended or adjusted under 35 U.S.C. 154(b) by 108 days.

(21) Appl. No.: 13/245,004

(22) Filed: Sep. 26, 2011

(65) Prior Publication Data
US 2013/0077901 A1    Mar. 28, 2013

(51) Int. Cl.
*F16C 31/00* (2006.01)
*E05D 15/06* (2006.01)
*E05D 15/30* (2006.01)

(52) U.S. Cl.
USPC ............... 384/26; 384/25; 384/54; 16/345; 16/364

(58) Field of Classification Search
USPC .............. 384/40, 44, 20–21, 24–26, 54; 361/681–683; 16/223, 239, 346–348, 16/357, 360–364; 248/451–456, 461, 345, 248/364
See application file for complete search history.

(56) References Cited

U.S. PATENT DOCUMENTS

| | | | | |
|---|---|---|---|---|
| 543,812 A * | 7/1895 | Platt | | 312/231 |
| 1,990,103 A * | 2/1935 | Van Alstyne | | 248/447 |
| 4,978,096 A * | 12/1990 | Struckmann | | 248/461 |
| 5,548,478 A * | 8/1996 | Kumar et al. | | 16/223 |
| 6,679,468 B1 * | 1/2004 | Hsu | | 248/461 |
| 7,065,835 B2 * | 6/2006 | Kuramochi | | 361/803 |
| 7,650,671 B2 * | 1/2010 | Lee | | 16/362 |
| 2005/0139740 A1 * | 6/2005 | Chen et al. | | 361/681 |
| 2008/0052874 A1 * | 3/2008 | Liu | | 16/246 |
| 2008/0174942 A1 * | 7/2008 | Yang et al. | | 361/680 |
| 2008/0304215 A1 * | 12/2008 | Chiu | | 361/681 |
| 2009/0320244 A1 * | 12/2009 | Lin | | 16/362 |
| 2010/0000052 A1 * | 1/2010 | Chung | | 16/364 |
| 2010/0299873 A1 * | 12/2010 | Song | | 16/236 |
| 2011/0023272 A1 * | 2/2011 | Huang | | 16/362 |
| 2011/0170812 A1 * | 7/2011 | Lee | | 384/26 |

* cited by examiner

*Primary Examiner* — Marcus Charles
(74) *Attorney, Agent, or Firm* — Rosenberg, Klein & Lee

(57) ABSTRACT

A relative sliding rail structure using a pivoting mechanism mainly includes a pivot shaft, a main frame, a sliding-guided member and a pivoting seat. The main frame is connected to the pivot shaft via the pivoting seat. The sliding-guided member includes at least one sliding-guided portion engaged to a sliding seat of the main frame, so that the main frame and the sliding-guided member are relatively moved when the main frame is moved along the sliding-guided member. The main frame includes a hollow portion disposed on the sliding seat, and the pivoting seat is combined with at least one roller, wherein the roller is appropriately passed through the hollow portion to enter the sliding seat of the main frame to abut against the sliding-guided portion of the sliding-guided member, so that the main frame and the sliding-guided member are connected to each other to form a stable mutual sliding combination.

22 Claims, 7 Drawing Sheets

RELATIVE SLIDING RAIL STRUCTURE USING PIVOTING MECHANISM

BACKGROUND OF THE INVENTION

1. Field of the Invention

The present invention relates to a relative sliding rail structure using a pivoting mechanism, and in particular relates to a rail structure providing a sliding component capable of sliding and pivotal lifting.

2. Description of the Related Art

With rapid development of electronic industries, various portable devices (e.g., mobile phone, computing devices, personal digital assistant and portable computers) are widely applied in our life, and different structural types of the portable devices have been developed to facilitate the operation process. Typically, a sliding-cover mechanism is a combination type widely used in these portable devices, providing a shielding effect to store a larger operation mechanism in a smaller space. Taking a simple relative sliding function formed between a slide cover and a body of an electronic device for example, it is intended to expose a particular portion of the body for operation use by sliding the slide cover on the body. However, due to the consumer's increasing functional requirements to the electronic devices, the simple relative sliding function of the sliding-cover mechanism is gradually lesser competition or even eliminated in the markets. Herewith, a combination of a slide-cover mechanism and a lifting-cover mechanism is accordingly published.

For example, Taiwan Patent Publication No. 1278216 discloses a mobile device providing a combination of a slide-cover function and a lifting-cover function. The mobile device mainly comprises a first module and a second module. The first module is composed of a first housing and a first keyboard part disposed on the first housing. The second module is composed of a display module, a second housing and a second keyboard part. The second housing of the second module is connected to the first housing of the first module by sliding along an X-axis, and the display module is pivoted to the second housing by revolving around a Y-axis perpendicular to the X-axis, thereby forming a slidable second housing and a liftable display module structure.

However, in the above-described structure providing the sliding cover and the lifting cover, because the slidable first housing and the liftable display module are two individual modules and each of them has an independent integral body and connection relationship, the whole assembled structure is very complicated, and the sliding and lifting mechanisms are tended to be loosened or even malfunctioned after a long-term operation.

BRIEF SUMMARY OF THE INVENTION

In view of this, the invention provides a relative sliding rail structure using a pivoting mechanism to overcome the difficulties of the conventional mechanism provided with the sliding cover and the lifting cover.

The main purpose of the present invention is to provide a relative sliding rail structure using a pivoting mechanism, enabling a sliding-guided member to be slid on a corresponding main frame and to be pivotally lifted and positioned at any opening angle, complying to various requirements, and increasing the usability of an electronic device.

Another purpose of the present invention is to provide a relative sliding rail structure using a pivoting mechanism, enabling a sliding-guided member and a corresponding main frame, which are provided with relative sliding function, to have a stable combination and sliding smoothness therebetween.

To attain the purpose above, the technical way adopted by the present invention comprises a pivot shaft, a main frame and a sliding-guided member. The pivot shaft is pivoted on a lower cover. The main frame, connected to and accompanying the pivot shaft to form an assembly structure capable of being synchronically pivoted, comprises at least one sliding seat. The sliding-guided member comprises at least one sliding-guided portion engaged to the sliding seat of the main frame, so that the main frame and the sliding-guided member are relatively moved when the main frame is moved along a trajectory of the sliding-guided member.

According to the relative sliding rail structure, the sliding seat of the main frame is formed by a bent and recessed accommodation portion.

According to the relative sliding rail structure, the relative sliding rail structure further comprises a pivoting seat disposed outside the sliding seat of the main frame and combined with the pivot shaft.

According to the relative sliding rail structure, the pivot shaft includes at least one planer surface disposed on a peripheral edge of a connection portion of the pivot shaft and the pivoting seat, the pivoting seat includes a long hole corresponding to the planer surface of the pivot shaft and having a section equal to that of the pivot shaft, and the pivot shaft provided with the planer surface is entered into the long hole of the pivoting seat so that the pivot shaft and the pivot shaft form the assembly structure capable of being synchronically pivoted.

According to the relative sliding rail structure, the main frame includes at least one hollow portion disposed on the sliding seat, the pivoting seat is combined with at least one roller providing elasticity, and the roller is appropriately passed through the hollow portion to enter the sliding seat of the main frame to abut against the sliding-guided portion of the sliding-guided member.

According to the relative sliding rail structure, the pivoting seat includes an accommodation space corresponding to the hollow portion of the main frame, a floating seat disposed in the accommodation space of the pivoting seat is abutted against by a plurality of elastic members, and the roller is disposed on the floating seat.

According to the relative sliding rail structure, the floating seat includes a recess utilized to accommodate the elastic member, and a protrusion disposed in the accommodation space of the pivoting seat is utilized to embed in and abut against the elastic member accommodated in the floating seat.

According to the relative sliding rail structure, the lower cover includes a pivotal frame, and the pivot shaft of the relative sliding rail structure is pivoted on the pivotal frame of the lower cover.

According to the relative sliding rail structure, the pivot shaft includes a peripheral edge and a to-be-retained portion protruded from the peripheral edge, the pivotal frame of the lower cover includes a corresponding side relative to the to-be-retained portion of the pivot shaft and a retaining portion protruded from the corresponding side, so that a pivoting angle of the pivot shaft is limited by a retaining function formed between the to-be-retained portion of the pivot shaft and the retaining portion of the pivotal frame of the lower cover.

According to the relative sliding rail structure, two sides of two ends of the sliding-guided portion of the sliding-guided member are respectively provided with protruded side retaining portions, so that the sliding-guided member is slidably limited when the side retaining portion of the sliding-guided member is abutted against the side of the sliding seat of the main frame.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
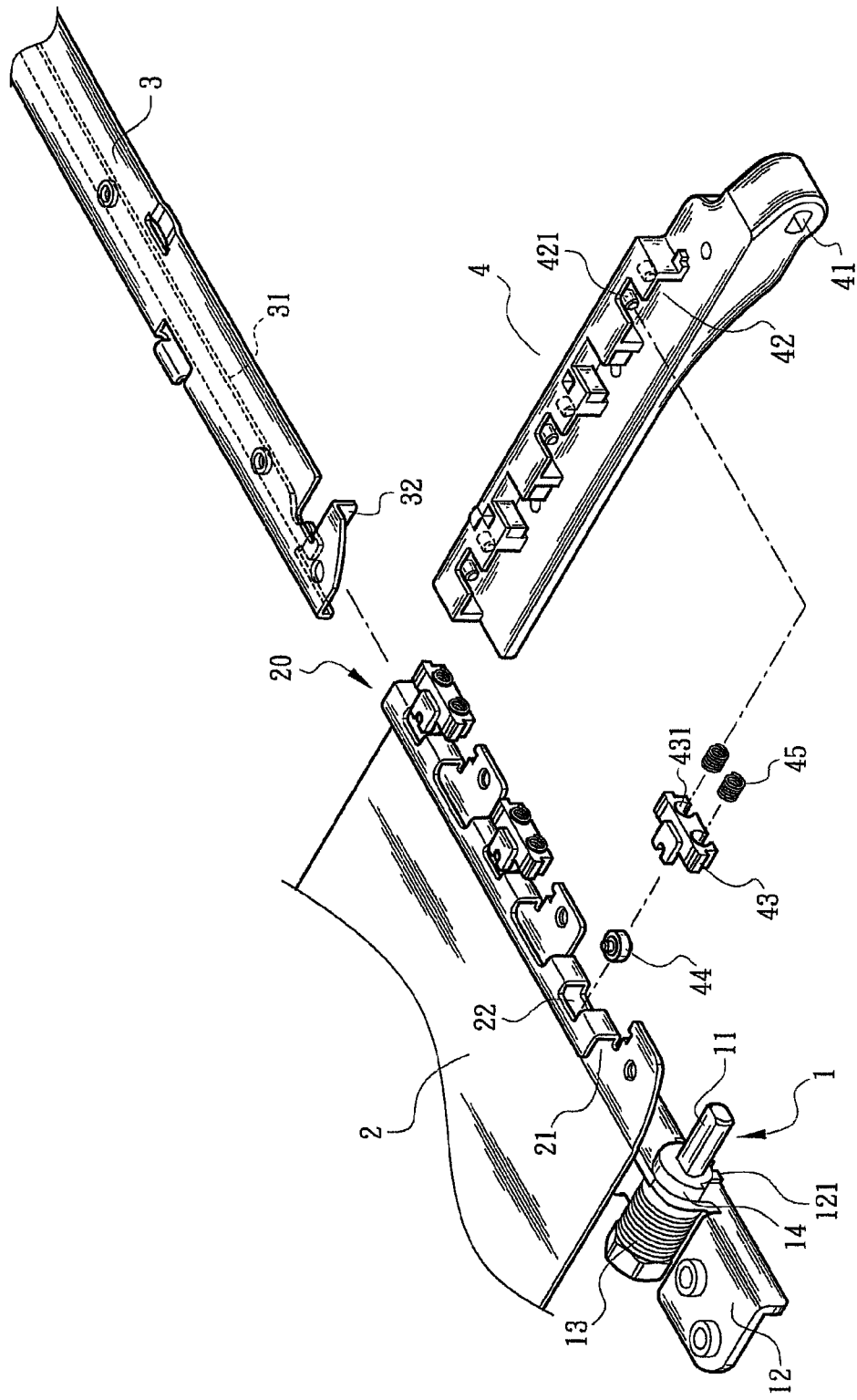
FIG. 1 is a structural exploded view of the invention.
Figure 2:
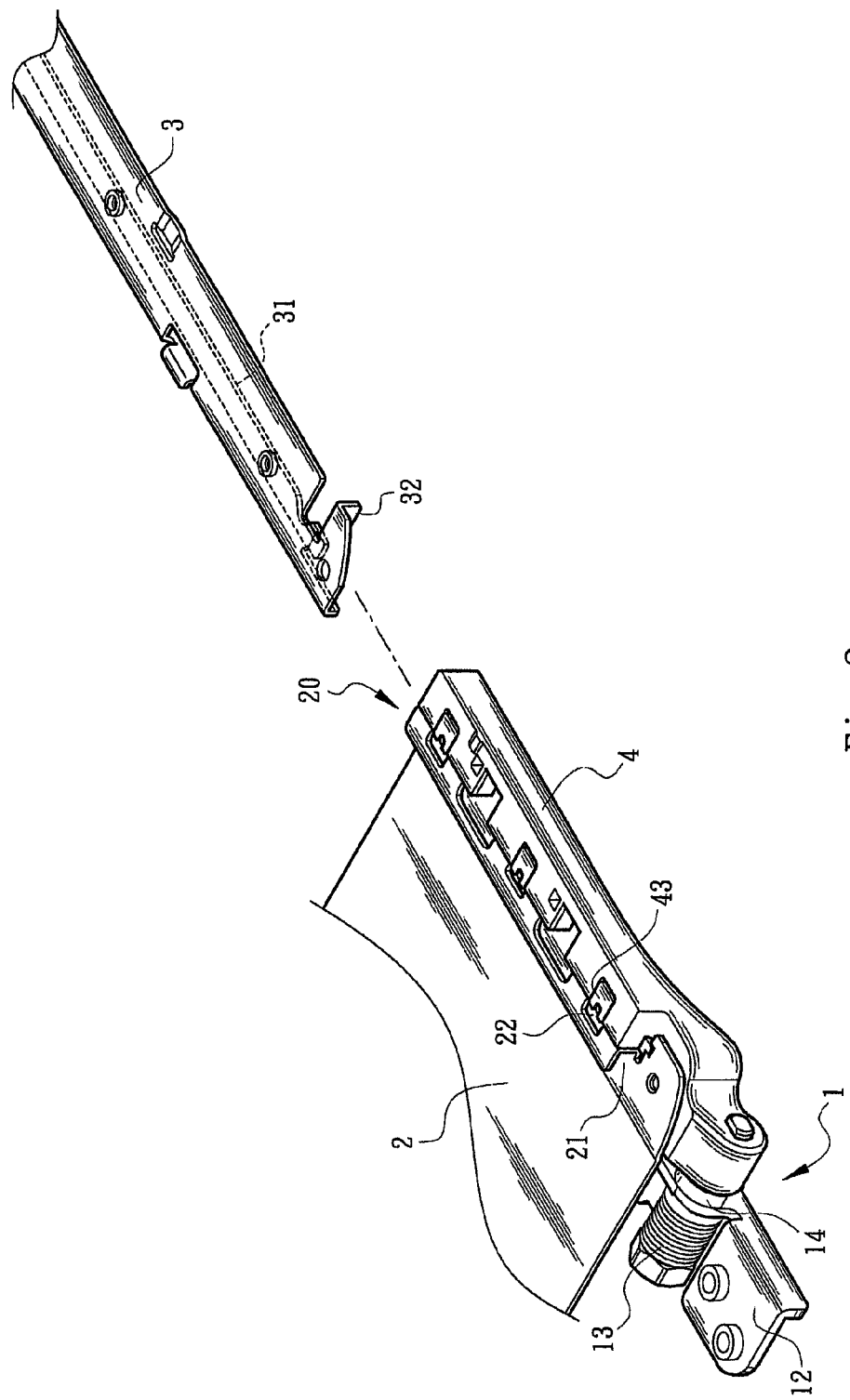
FIG. 2 is a partial assembled schematic view of the invention.
Figure 3:
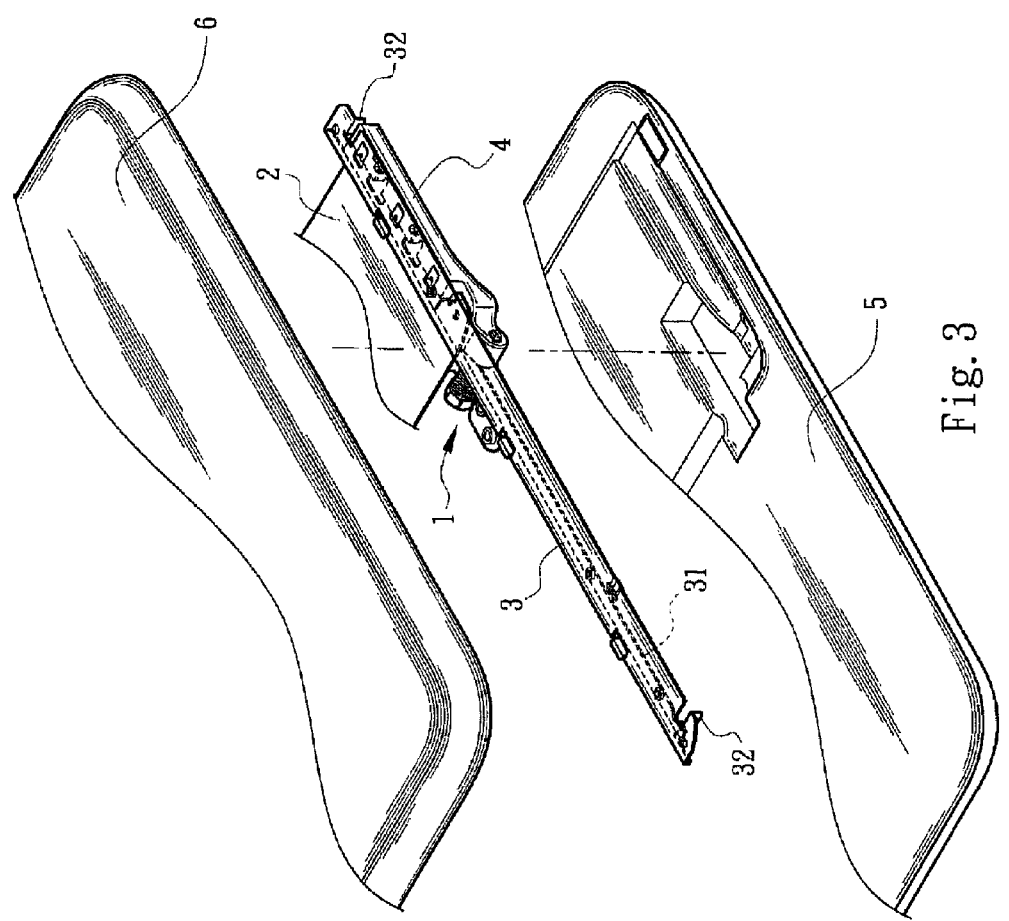
FIG. 3 is a whole assembled schematic view of the invention.
Figure 4:
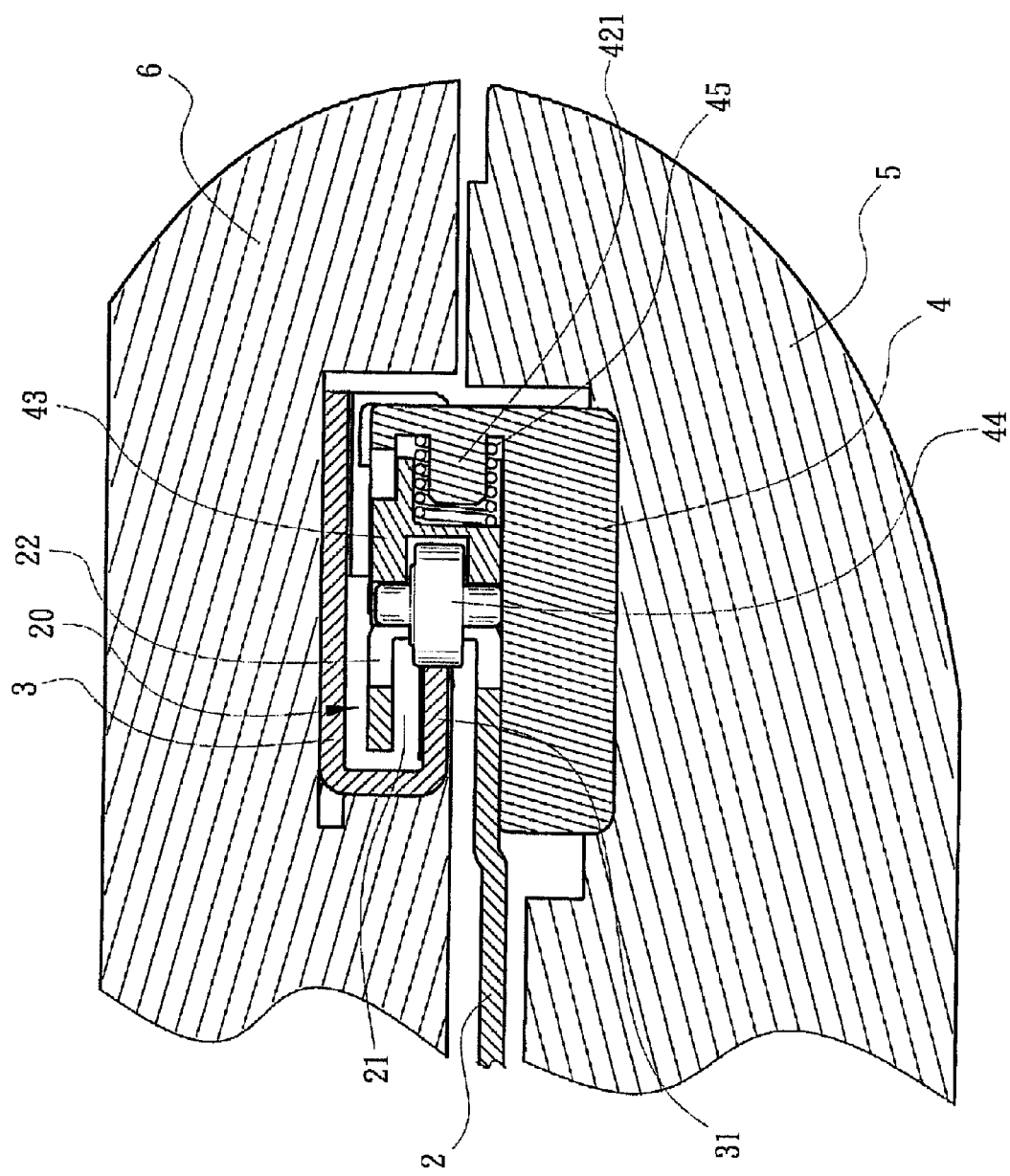
FIG. 4 is a sectional view of a connection portion of a main frame and a sliding seat of the invention.

The following description is of the best-contemplated mode of carrying out the invention. This description is made for the purpose of illustrating the general principles of the invention and should not be taken in a limiting sense. The scope of the invention is best determined by reference to the appended claims.

Referring to FIGS. 1, 2, 3 and 4, a relative sliding rail structure using a pivoting mechanism of the present invention comprises a pivot shaft 1, a main frame 2 disposed beside the pivot shaft 1, a sliding-guided member 3 and a pivoting seat 4, wherein the pivot shaft 1 can be directly or indirectly pivoted to a lower cover 5 (or a bottom seat) of an electronic device (shown in FIGS. 3 and 4), and the main frame 2 is connected to and accompanying the pivot shaft 1 to form an assembly structure capable of being synchronically pivoted. In this embodiment, a pivotal frame 12 is disposed on the lower cover 5 of the electronic device, the pivot shaft 1 is pivoted on the pivotal frame 12, and a pivotal elastic member 13 is abutted against the pivot shaft 1, so that the pivot shaft 1 can be elastically projected and extended toward one side of the pivotal frame 12 by the elasticity of the pivotal elastic member 13. The pivot shaft 1 includes at least one planer surface 11 and a to-be-retained portion 14, wherein the planer surface 11 is disposed on a peripheral edge of one end of the pivot shaft 1 (or of a connection portion of the pivot shaft 1 and the pivoting seat 4), and the to-be-retained portion 14 is protruded from a peripheral edge of a middle section of the pivot shaft 1. The pivotal frame 12 includes a corresponding side relative to the to-be-retained portion 14 of the pivot shaft 1 and a retaining portion 121 protruded from the corresponding side, so that a pivoting angle of the pivot shaft 1 is limited by a retaining function formed between the to-be-retained portion 14 of the pivot shaft 1 and the retaining portion 121 of the pivotal frame 12. The main frame 2 comprises at least one sliding seat 20 and at least one hollow portion 22, wherein the sliding seat 20 is formed by a bent and recessed accommodation portion 21, and the hollow portion 22 is disposed on the sliding seat 20. In actual application, the sliding-guided member 3 is connected to an upper cover 6 of the electronic device.

The sliding-guided member 3 comprises at least one sliding-guided portion 31 (e.g., a sliding rail) and two protruded side retaining portions 32 respectively disposed on two sides of two ends of the sliding-guided portion 31. The sliding-guided portion 31 of the sliding-guided member 3 is engaged d to the sliding seat 20 of the main frame 2 by entering the accommodation portion 21 of the sliding seat 20, so that the main frame 2 and the sliding-guided member 3 are relatively moved when the main frame 2 is moved along a trajectory of the sliding-guided member 3. The movement of the sliding-guided member 3 is slidably limited when the side retaining portion 32 of the sliding-guided member 3 is abutted against the side of the accommodation portion 21 of the sliding seat 20 of the main frame 2. The pivoting seat 4 is connectively disposed outside the accommodation portion 21 of the sliding seat 20 of the main frame 2. The pivoting seat 4 includes a long hole 41 corresponding to the planer surface 11 of the pivot shaft 1 and having a section equal to that of the pivot shaft 1, and the pivot shaft 1 provided with the planer surface 11 is entered into the long hole 41 of the pivoting seat 4, so that the pivot shaft 1 and the pivot shaft 1 form the assembly structure capable of being synchronically pivoted. The pivoting seat 4 includes an accommodation space 42 corresponding to the hollow portion 22 of the main frame 2. A plurality of floating seats 43 are disposed in the accommodation spaces 42 of the pivoting seat 4, and each of the floating seats 43 includes recesses 431 utilized to accommodate a plurality of elastic members 45. A plurality of protrusions 421 disposed in the accommodation space 42 of the pivoting seat 4 are utilized to embed in and abut against the elastic members 45 accommodated in the floating seat 43, so that the floating seats 43 is abutted against by the elastic members 45. The pivoting seat 4 is combined with a plurality of rollers 44 providing elasticity. Each of the rollers 44 disposed on the floating seat 43 is appropriately passed through the hollow portion 22 to enter the sliding seat 20 of the main frame 2 to abut against the sliding-guided portion 31 of the sliding-guided member 3.

Figure 5:
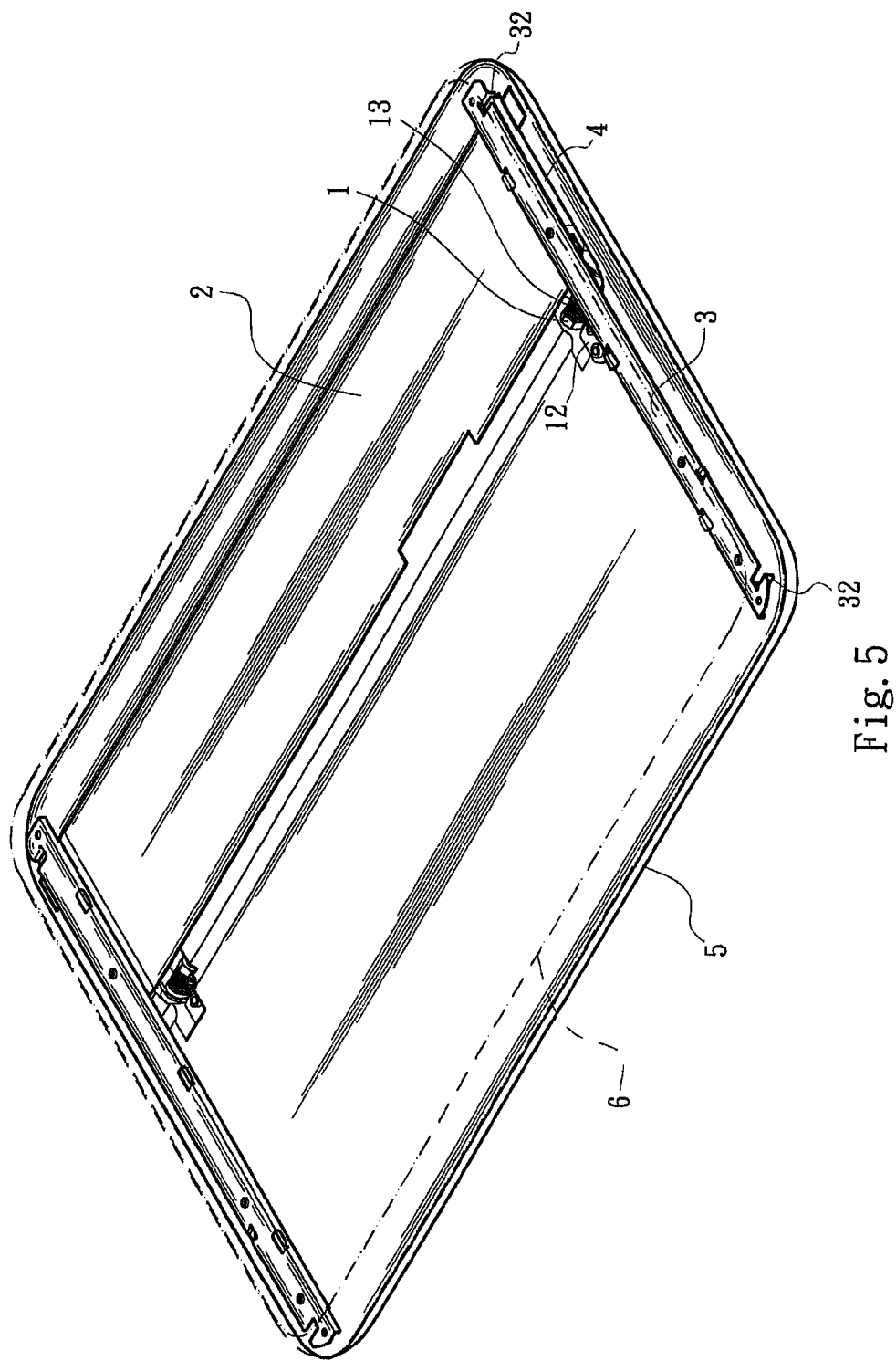
FIG. 5 is a schematic view of a complete assembly of an embodiment of the invention.
Figure 6:
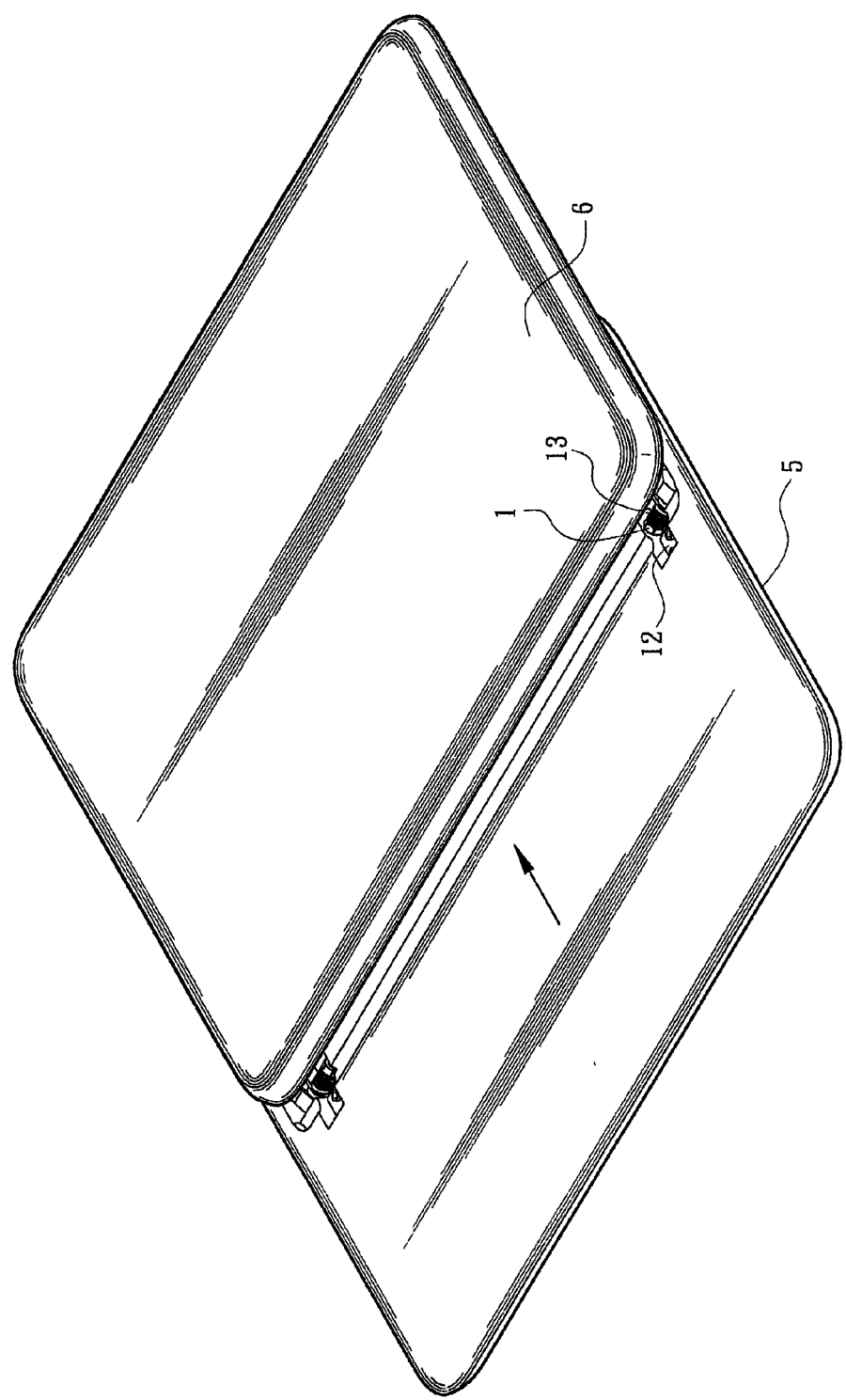
FIG. 6 is a schematic view of one operation status of the invention.
Figure 7:
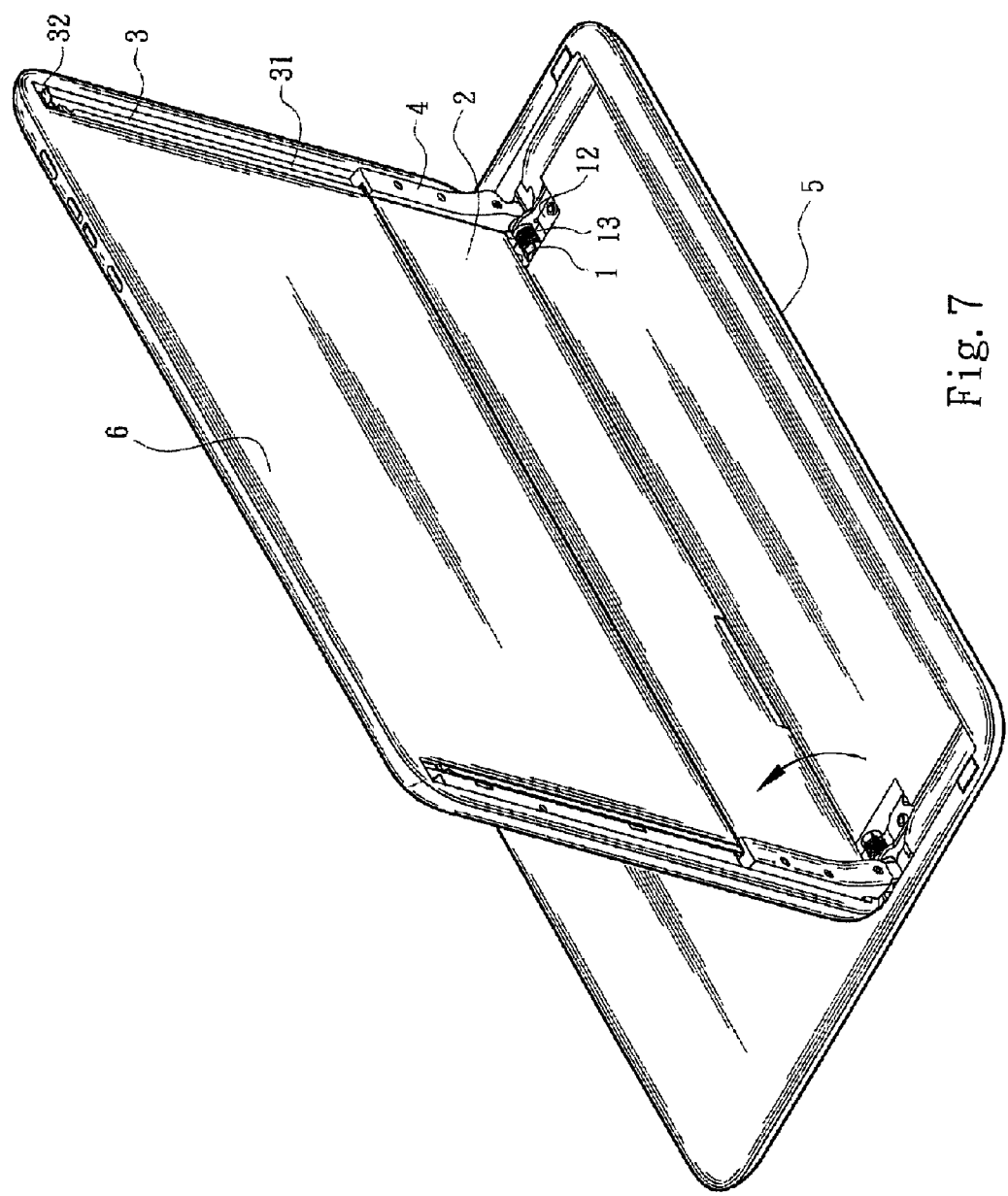
FIG. 7 is a schematic view of one operation status of the invention.

Referring to FIGS. 5, 6 and 7, the upper cover 6 is fully covered on the lower cover 5 (shown in FIG. 5) when the electronic device is stored. In the opening process of the electronic device, the upper cover 6 is pushed to link the sliding-guided member 3 to slide on the main frame 2, and the sliding-guided member 3 is stopped to be situated in a fully-open position as shown in FIG. 6 until the side retaining portion 32 of the sliding-guided member 3 is abutted against the side of the accommodation portion 21 of the sliding seat 20 of the main frame 2. Then, the upper cover 6 is pushed and pulled to be centrally rotated about the pivot shaft 1 and to link the pivoting seat 4 (the pivot shaft 1) for rotation, and the pivot shaft 1 is packed by the pivotal elastic member 13 to generate a frictional force capable of positioning the cover 6 at any opening angle relative to the lower cover 5 (shown in FIG. 7), thereby increasing the usability of the electronic device.

In conclusion, the relative sliding rail structure using the pivoting mechanism of the present invention surely can attain a stable sliding process and provide with a sliding and pivotal lifting effect; therefore, the present invention involves inventiveness and an inventive step. While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A relative sliding rail structure using a pivoting mechanism, the relative sliding rail structure comprising:
   a pivot shaft pivoted on a lower cover;
   a main frame connected to and accompanying the pivot shaft to form an assembly structure capable of being synchronically pivoted, comprising at least one sliding seat;
   a pivoting seat disposed outside the sliding seat of the main frame and combined with the pivot shaft; and
   a sliding-guided member comprising at least one sliding-guided portion engaged to the sliding seat of the main frame, so that the main frame and the sliding-guided member are relatively moved when the main frame is moved along a trajectory of the sliding-guided member, wherein the pivot shaft includes at least one planer surface disposed on a peripheral edge of a connection portion of the pivot shaft and the pivoting seat, the pivoting seat includes a long hole corresponding to the planer surface of the pivot shaft and having a section equal to that of the pivot shaft, and the pivot shaft provided with the planer surface is entered into the long hole of the pivoting seat so that the pivot shaft and the pivot shaft form the assembly structure capable of being synchronically pivoted.

2. The relative sliding rail structure using the pivoting mechanism as claimed in claim 1, wherein the sliding seat of the main frame is formed by a bent and recessed accommodation portion.

3. The relative sliding rail structure using the pivoting mechanism as claimed in claim 2, wherein the main frame includes at least one hollow portion disposed on the sliding seat, the pivoting seat is combined with at least one roller providing elasticity, and the roller is appropriately passed through the hollow portion to enter the sliding seat of the main frame to abut against the sliding-guided portion of the sliding-guided member.

4. The relative sliding rail structure using the pivoting mechanism as claimed in claim 3, wherein the floating seat includes a recess utilized to accommodate the elastic member, and a protrusion disposed in the accommodation space of the pivoting seat is utilized to embed in and abut against the elastic member accommodated in the floating seat.

5. The relative sliding rail structure using the pivoting mechanism as claimed in claim 4, wherein a pivot frame is disposed on the lower cover, and the pivot shaft of the relative sliding rail structure is pivoted on the pivotal frame of the lower cover.

6. The relative sliding rail structure using the pivoting mechanism as claimed in claim 5, wherein the pivot shaft includes a peripheral edge and a to-be-retained portion protruded from the peripheral edge, the pivotal frame of the lower cover includes a corresponding side relative to the to-be-retained portion of the pivot shaft and a retaining portion protruded from the corresponding side, so that a pivoting angle of the pivot shaft is limited by a retaining function formed between the to-be-retained portion of the pivot shaft and the retaining portion of the pivotal frame of the lower cover.

7. The relative sliding rail structure using the pivoting mechanism as claimed in claim 3, wherein two sides of two ends of the sliding-guided portion of the sliding-guided member are respectively provided with protruded side retaining portions, so that the sliding-guided member is slidably limited when the side retaining portion of the sliding-guided member is abutted against the side of the sliding seat of the main frame.

8. The relative sliding rail structure using the pivoting mechanism as claimed in claim 2, wherein a pivot frame is disposed on the lower cover, and the pivot shaft of the relative sliding rail structure is pivoted on the pivotal frame of the lower cover.

9. The relative sliding rail structure using the pivoting mechanism as claimed in claim 8, wherein two sides of two ends of the sliding-guided portion of the sliding-guided member are respectively provided with protruded side retaining portions, so that the sliding-guided member is slidably limited when the side retaining portion of the sliding-guided member is abutted against the side of the sliding seat of the main frame.

10. The relative sliding rail structure using the pivoting mechanism as claimed in claim 2, wherein two sides of two ends of the sliding-guided portion of the sliding-guided member are respectively provided with protruded side retaining portions, so that the sliding-guided member is slidably limited when the side retaining portion of the sliding-guided member is abutted against the side of the sliding seat of the main frame.

11. The relative sliding rail structure using the pivoting mechanism as claimed in claim 1, wherein the main frame includes at least one hollow portion disposed on the sliding seat, the pivoting seat is combined with at least one roller providing elasticity, and the roller is appropriately passed through the hollow portion to enter the sliding seat of the main frame to abut against the sliding-guided portion of the sliding-guided member.

12. The relative sliding rail structure using the pivoting mechanism as claimed in claim 11, wherein the pivoting seat includes an accommodation space corresponding to the hollow portion of the main frame, a floating seat disposed in the accommodation space of the pivoting seat is abutted against by a plurality of elastic members, and the roller is disposed on the floating seat.

13. The relative sliding rail structure using the pivoting mechanism as claimed in claim 12, wherein a pivot frame is disposed on the lower cover, and the pivot shaft of the relative sliding rail structure is pivoted on the pivotal frame of the lower cover.

14. The relative sliding rail structure using the pivoting mechanism as claimed in claim 13, wherein the pivot shaft includes a peripheral edge and a to-be-retained portion protruded from the peripheral edge, the pivotal frame of the lower cover includes a corresponding side relative to the to-be-retained portion of the pivot shaft and a retaining portion protruded from the corresponding side, so that a pivoting angle of the pivot shaft is limited by a retaining function formed between the to-be-retained portion of the pivot shaft and the retaining portion of the pivotal frame of the lower cover.

15. The relative sliding rail structure using the pivoting mechanism as claimed in claim 11, wherein a pivot frame is disposed on the lower cover, and the pivot shaft of the relative sliding rail structure is pivoted on the pivotal frame of the lower cover.

16. The relative sliding rail structure using the pivoting mechanism as claimed in claim 15, wherein the pivot shaft includes a peripheral edge and a to-be-retained portion protruded from the peripheral edge, the pivotal frame of the lower cover includes a corresponding side relative to the to-be-retained portion of the pivot shaft and a retaining portion protruded from the corresponding side, so that a pivoting angle of the pivot shaft is limited by a retaining function formed between the to-be-retained portion of the pivot shaft and the retaining portion of the pivotal frame of the lower cover.

17. The relative sliding rail structure using the pivoting mechanism as claimed in claim 11, wherein two sides of two ends of the sliding-guided portion of the sliding-guided member are respectively provided with protruded side retaining portions, so that the sliding-guided member is slidably limited when the side retaining portion of the sliding-guided member is abutted against the side of the sliding seat of the main frame.

18. The relative sliding rail structure using the pivoting mechanism as claimed in claim 1, wherein a pivot frame is disposed on the lower cover, and the pivot shaft of the relative sliding rail structure is pivoted on the pivotal frame of the lower cover.

19. The relative sliding rail structure using the pivoting mechanism as claimed in claim 18, wherein the pivot shaft includes a peripheral edge and a to-be-retained portion protruded from the peripheral edge, the pivotal frame of the lower cover includes a corresponding side relative to the to-be-retained portion of the pivot shaft and a retaining portion protruded from the corresponding side, so that a pivoting angle of the pivot shaft is limited by a retaining function formed between the to-be-retained portion of the pivot shaft and the retaining portion of the pivotal frame of the lower cover.

20. The relative sliding rail structure using the pivoting mechanism as claimed in claim 19, wherein two sides of two ends of the sliding-guided portion of the sliding-guided member are respectively provided with protruded side retaining portions, so that the sliding-guided member is slidably limited when the side retaining portion of the sliding-guided member is abutted against the side of the sliding seat of the main frame.

21. The relative sliding rail structure using the pivoting mechanism as claimed in claim 18, wherein two sides of two ends of the sliding-guided portion of the sliding-guided member are respectively provided with protruded side retaining portions, so that the sliding-guided member is slidably limited when the side retaining portion of the sliding-guided member is abutted against the side of the sliding seat of the main frame.

22. The relative sliding rail structure using the pivoting mechanism as claimed in claim 1, wherein two sides of two ends of the sliding-guided portion of the sliding-guided member are respectively provided with protruded side retaining portions, so that the sliding-guided member is slidably limited when the side retaining portion of the sliding-guided member is abutted against the side of the sliding seat of the main frame.

\* \* \* \* \*